United States Patent
Haldar et al.

(10) Patent No.: US 7,260,386 B1
(45) Date of Patent: Aug. 21, 2007

(54) METHOD AND SYSTEM FOR CHANGING A SERVICE ACCOUNT PROFILE FROM A STATION OPERATED UNDER ANOTHER SERVICE ACCOUNT

(75) Inventors: Debashis Haldar, Olathe, KS (US); Baoquan Zhang, Overland Park, KS (US); Thomas M. Sladek, Overland Park, KS (US); Charles E. Woodson, Peculiar, MO (US); Mark Marsee, Olathe, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 825 days.

(21) Appl. No.: 10/602,389

(22) Filed: Jun. 24, 2003

Related U.S. Application Data (63) Continuation-in-part of application No. 09/459,206, filed on Dec. 10, 1999, now Pat. No. 6,718,178, which is a continuation-in-part of application No. 09/411,885, filed on Oct. 4, 1999, now Pat. No. 6,522,876.

(51) Int. Cl.
*H04M 3/42* (2006.01)

(52) U.S. Cl. .................................. 455/417; 379/211.02
(58) Field of Classification Search ................ 455/417, 455/414.1, 445; 379/211.02
See application file for complete search history.

(56) References Cited

U.S. PATENT DOCUMENTS 6,141,545 A * 10/2000 Begeja et al. ................ 455/417
6,795,707 B2 * 9/2004 Martin et al. ................ 455/446

OTHER PUBLICATIONS

"Call Forward w/ Remote Activation," http://www.cccomm.net/AtHome/Calling_Features/callfwdwremote.htm, (2 pages) printed from the World Wide Web on Nov. 27, 2002.

* cited by examiner

*Primary Examiner*—Creighton Smith (57) ABSTRACT

A method and system in which a subscriber station that is operating under one subscriber account can make changes to a service profile that is associated with another subscriber account. The subscriber station operating under the one subscriber account will send a feature code into a telecommunications network, and, based at least in part on the feature code, the network will identify a change to make to the profile of at least one other subscriber account. The network will then make the identified change to the profile of the at least one other subscriber account.

32 Claims, 4 Drawing Sheets

METHOD AND SYSTEM FOR CHANGING A SERVICE ACCOUNT PROFILE FROM A STATION OPERATED UNDER ANOTHER SERVICE ACCOUNT

REFERENCE TO RELATED APPLICATIONS

This application is a continuation-in-part of co-pending U.S. patent application Ser. No. 09/459,206, filed Dec. 10, 1999 now U.S. Pat. No. 6,718,178, which is a continuation-in-part of U.S. patent application Ser. No. 09/411,885 (filed Oct. 4, 1999), which issued as U.S. Pat. No. 6,522,876 on Feb. 18, 2003. The entirety of application Ser. No. 09/459,206 and the entirety of application Ser. No. 09/411,885 are incorporated herein by reference.

BACKGROUND

1. Field of the Invention

The present invention relates to network communications and, more particularly, to management of subscriber service profiles for telecommunication services.

2. Description of Related Art

A typical telecommunication system comprises one or more serving systems through which subscribers can gain access to transport networks such as the public switched telephone network (PSTN) or the Internet for instance. Generally speaking, a service provider may operate and/or control such a serving system and may therefore govern subscriber communications over the transport network(s).

For example, a service provider may operate a serving system through which subscribers can place landline or wireless telephone calls over the PSTN. The serving system may comprise a switch that receives requests to connect calls to or from subscribers and that sets up and connects the calls. In that arrangement, a subscriber may send to the serving system a set of dialed digits indicating a telephone number being called, and the serving system may work to establish a connection with the called number. If successful, the serving system may then connect the call to the called number and allow the call to proceed.

As another example, a service provider may operate a central controller, such as a service control point (SCP), that assists in call processing via one or more serving systems. Applying well known "intelligent network" principles, for instance, a serving system may automatically signal to the central controller when a request is made to connect a call to or from a subscriber via the serving system. The central controller may then apply service logic and send a response to the serving system, instructing the serving system how to handle the call or simply ending the transaction.

A service provider typically maintains an account for each subscriber that it serves, in order to define service authorizations for the subscriber and to facilitate billing. Usually, each subscriber account will have a corresponding service profile that indicates the scope of service to be provided, and the service provider will refer to the profile when serving the subscriber, in order to determine what services to provide or not to provide.

In a telephone system, for instance, a subscriber's profile may indicate how the service provider should handle or respond to attempts to connect telephone calls to or from a given subscriber. For example, the subscriber's profile may indicate that the subscriber is not allowed to place calls to certain area codes, and so the service provider may block any attempt by the subscriber to place calls to those area codes. As another example, the subscriber's profile may indicate that some or all calls to the subscriber should be forwarded to another number or to voice mail under certain conditions, and so the service provider may accordingly forward an incoming call under those conditions.

Typically, each subscriber account will have a corresponding account number or other account identifier, and the account profile will be keyed to that number or other identifier. For example, in a landline telephone system, each customer's account has a directory number that is assigned to the telephone line extending to the customer's premises. A telephone company may then maintain a service profile for each account, keyed to the assigned directory number. When the telephone company processes calls to or from a given directory number, the company may then refer to the service profile that is keyed to that directory number.

As another example, in a mobile telephone system, each mobile phone typically has an assigned identifier (e.g., a mobile directory number (MDN), a mobile identification number (MIN) or mobile station identifier (MSID)). A wireless carrier may then maintain a service profile for each mobile phone, keyed to the assigned identifier. And when the wireless carrier processes calls to or from a given mobile phone, the carrier may then refer to the service profile that is keyed to the mobile phone's identifier.

A service provider can maintain its subscribers' service profiles in various locations. For example, the service provider could maintain the profiles within the serving systems that serve the subscribers, such as in a local switching office for instance. The service profile for a landline subscriber could regularly reside in the serving system that provides the telephone line for the subscriber. Whereas, the service profile for a mobile subscriber could be downloaded to the serving system from a home location register (HLR) when the mobile subscriber is operating in the serving system. When the serving system receives a request to set up a call to or from a given subscriber, the serving system may then refer to the profile for that subscriber to determine how to process the request.

Additionally or alternatively, a service provider can maintain its subscribers' service profiles in a central controller, such as an SCP for instance. When a serving system receives a request to set up a call to or from a subscriber that it serves, the serving system may encounter an intelligent network trigger and responsively signal to the central controller. The central controller may then refer to the profile for that subscriber to determine how to proceed and may then instruct the serving system accordingly.

Certain services defined by a subscriber's service profile may be configurable. For example, a subscriber's profile may define a call-forwarding service as described above, and the subscriber may be allowed to set the forward-to number and to turn call-forwarding on or off at will. As another example, a subscriber profile may define a voice mail service, and the subscriber may be allowed to turn the service on or off.

To allow subscribers to configure services in their service profiles, the industry has for many years employed a concept known as "feature codes." A service provider may define specific digit sequences for use in activating, deactivating or modifying particular service features. Each sequence is known as a feature code (or, equivalently, a feature code string). A feature code usually consists of a preceding asterisk (*) or double asterisk (**) followed by a series of numeric digits (0 through 9), but could take other forms as well. Further, a pound sign (#) is sometimes used to delimit particular sequences of digits. For instance, the feature code string

*72 4085550303 could mean that a call forwarding forward-to number is being registered. In this example, *72 may indicate that the call-forwarding feature is being accessed, and the digit sequence 4085550303 may indicate the forward-to number.

When a subscriber sends a feature code to a serving system, the serving system may respond to the feature code by employing logic to change (i.e., activate, deactivate or modify) a service feature in a local copy of the subscriber's profile. Alternatively or additionally, the serving system may forward the dialed digits to a central controller, and the central controller may then respond to the feature code by activating, deactivating or modifying a service feature in the subscriber's profile and then sending a response message to the serving system.

SUMMARY

The present invention enables a subscriber station that is operating under one subscriber account to readily make changes to a profile that is associated with another subscriber account. In particular, according to an exemplary embodiment of the invention, a subscriber station that is operating under a subscriber account that has a given profile will send a feature code into a telecommunications network, and, based at least in part on the feature code, the network will identify a change to make to the profile of at least one other subscriber account. The network will then make the identified change to the profile of the at least one other subscriber account.

The invention can be usefully employed in a scenario where a user has multiple subscriber stations, each of which operates under a respective (different) subscriber account. In that scenario, the user could readily effect a change in the profile for one of the subscriber stations by sending a feature code into the network from another one of the subscriber stations.

For example, if a user owns both a car-mounted cell phone and a portable handheld cell phone, the user may operate the car phone to send a feature code into the network in order to turn on call forwarding for the handheld phone and to direct all calls to be forwarded to the car-mounted cell phone. As another example, if a user has mobile phone service under one account and landline phone service under another account, the user could operate his or her mobile phone to send a feature code into the network in order to turn on call forwarding for the landline account and to direct calls to be forwarded to the mobile phone.

As another example, the invention could be usefully employed to allow an administrator of one or more subscriber accounts to readily change the service profiles that are in effect for those accounts. For instance, using a subscriber station that operates under an administrator's subscriber account, an administrator could send a feature code into a network in order to activate or deactivate a particular service for multiple administered subscriber accounts. Based at least in part on the feature code, the network could then identify a change(s) to make to the service profiles for those administered accounts and could make the identified change(s).

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Example System

An exemplary embodiment of the invention is generally applicable in a scenario where a telecommunications network maintains a service profile respectively for each of a plurality of subscriber accounts. The profiles can be maintained in one or more serving systems, in one or more central repositories, such as SCPs or home registries, or in one or more other locations in the network. Further, the various subscriber accounts can be maintained by a common entity, such as a single carrier, or by multiple entities, such as separate carriers, whether landline and/or wireless.

Figure 1:
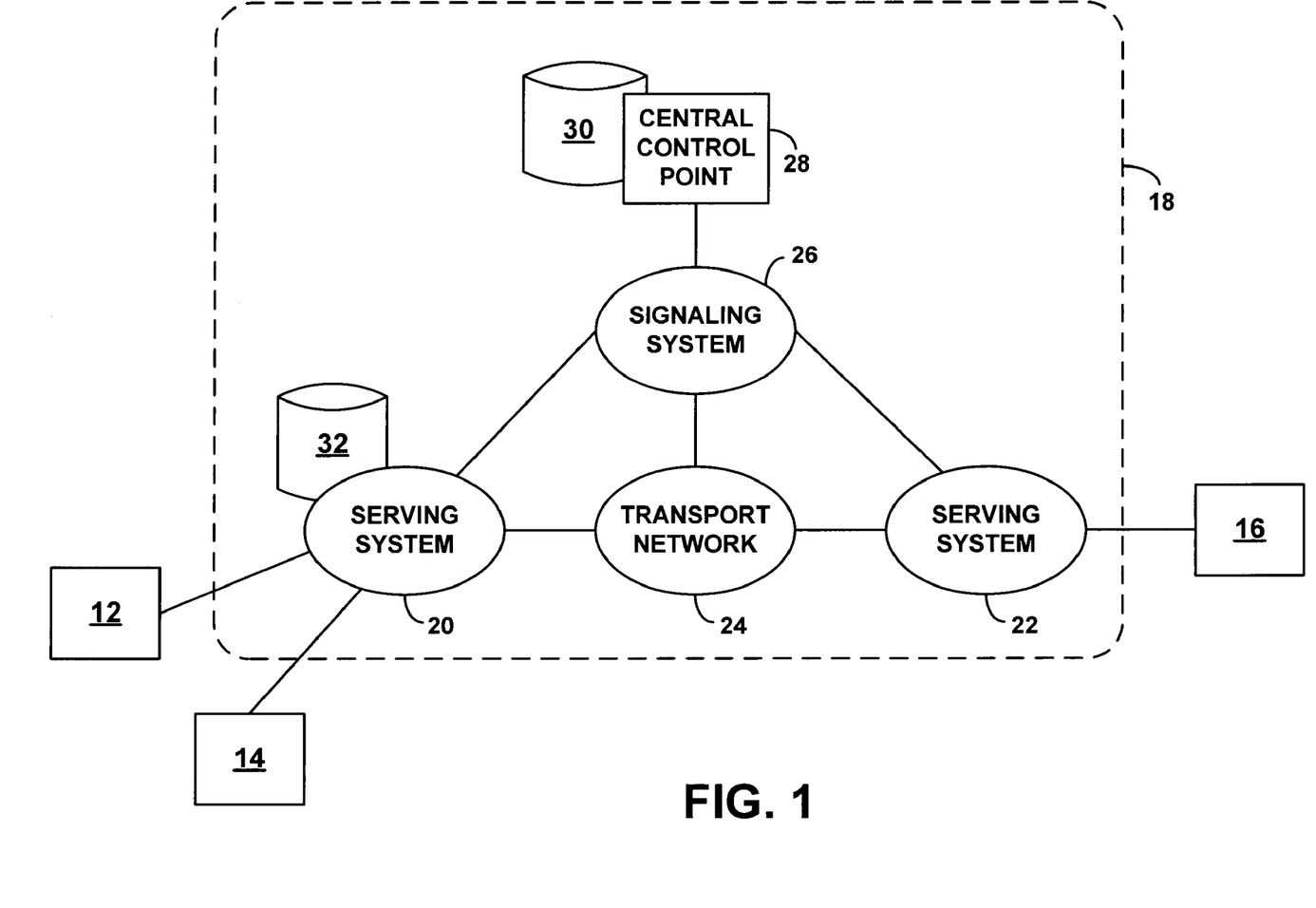
FIG. 1 is a block diagram of a system in which the exemplary embodiment can be employed.

FIG. 1 is a simplified block diagram of a system in which the exemplary embodiment can be employed. The purpose of this figure is to help illustrate by example how the invention can be arranged to operate in practice. Those skilled in the art will appreciate, however, that many variations on this arrangement are possible.

The example system shown in FIG. 1 includes three subscriber stations 12, 14, 16 that are arranged to communicate via a telecommunications network 18. Subscriber stations 12 and 14 are served by a serving system 20, and subscriber station 16 is served by another serving system 22. Both serving systems 20, 22 provide connectivity with a common transport network 24, and both serving systems are coupled with a common signaling system 26 that provides connectivity with a central control point 28. Central control point 28 then includes or is communicatively linked with a central profile store 30, and serving system 20 includes or is communicatively linked with a local profile store 32.

Stations 12, 14, 16 can take various forms. For instance, some or all of the stations can be landline telephones, and some or all of the stations could be mobile telephones. Other examples are also possible.

The serving systems can equally take various forms. For instance, as noted above, a serving system could comprise a switch that functions to set up and connect calls to and from a subscriber station, possibly via transport network 24, or in some cases locally through the switch. As such, the switch could include one or more processors and data storage, and the data storage could include program instructions executable by the processor to carry out various functions described herein, as well as reference data such as profiles and translation data.

Central control point 28, as well, can take various forms. For instance, it could be a integrated service control point (ISCP) made by Telcordia Technologies, Inc. As such, it too could include one or more processors and data storage, and the data storage could include program instructions executable by the processor to carry out various functions described here, as well as reference data such as profiles and translation data.

Signaling system 26 can be an out of band signaling system, such as an SS7 signaling system for instance, the operation of which is well known by those skilled in the art and is defined by standards such as IS-771 and ANSI-41 for instance. Alternatively, the signaling system could take other forms. In some embodiments, the signaling system 26 could coincide with the transport network 24. For instance, both could be integrated as a packet-switched network owned and operated by a service provider.

Profile stores 30, 32 may be databases that hold subscriber profile records for various subscriber accounts. By way of example, assume that subscriber stations 12, 14, 16 each operate under a respective subscriber account having a respective subscriber profile, and assume that central profile store 30 holds the profiles for all three stations (i.e., all three accounts). Further, assume that local profile store 32 also holds the profiles for stations 12 and 14.

2. Example Process

According to an exemplary embodiment, station 12 will send a feature code into the network 18 in order to change at least one service profile in effect for a subscriber account other than that under which station 12 is operating. For instance, the feature code could cause a change to occur in the service profiles in effect for the account under which station 14 is operating and/or the account under which station 16 is operating.

Figure 2:
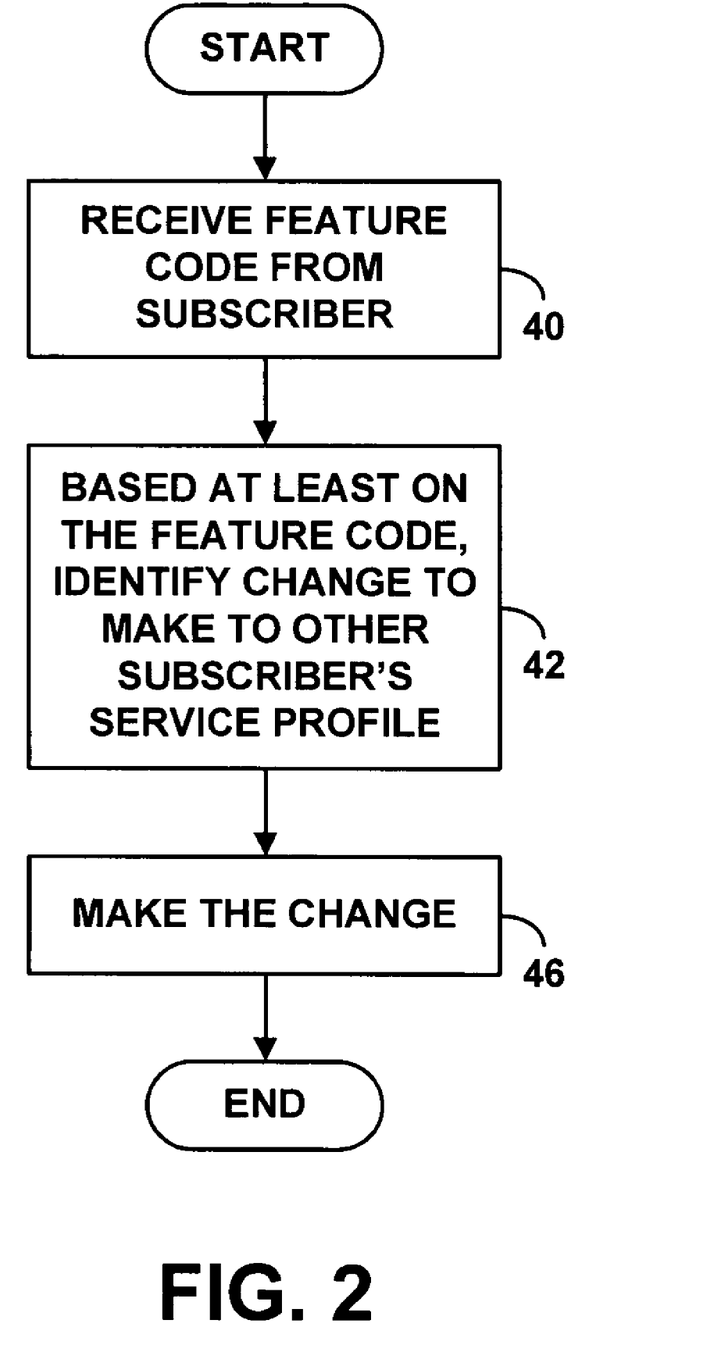
FIG. 2 is a flow chart depicting functions that can be carried out in accordance with the exemplary embodiment.

FIG. 2 is a flow chart illustrating how this process would occur, from the perspective of the network. As shown in FIG. 2, at step 40, the network 18 first receives from station 12 an origination message that includes a feature code. At step 42, based at least on the feature code, the network identifies a change to make to the at least one other account service profile. And at step 44, the network then makes the change.

Those skilled in the art will appreciate that an "origination message" is normally sent by a station (such as a telephone) as request to set up a call or other connection and would normally comprise "dialed digits" identifying a called party. (Note that the dialed digits may or may not literally be "dialed" and may include characters other than numerical digits.) From a landline phone, for instance, the origination message may simply be DTMF tones that represent dialed digits. From a mobile phone, on the other hand, the origination message may be a particular air-interface message that carries dialed digits as a parameter.

Normally, the dialed digits in an origination message from a subscriber station may also or alternatively comprise a feature code as described in the background section above, to invoke or toggle a service feature for the subscriber's account. In accordance with the exemplary embodiment, however, the feature code of the origination message that network 18 receives from station 12 will instead cause the network to change a service profile for another subscriber account, one other than that under which station 12 is operating. For instance, the feature code may cause the network to change the profile in effect for station 14 and/or the profile in effect for station 16.

Network 18 will preferably include logic to carry out the functions depicted in FIG. 2. The logic can take the form of software, firmware and/or hardware, as well as reference data, and can reside in one or more locations in the network 18. For example, the logic could reside in serving system 20 such as in a local switching office that handles requests to connect calls to or from station 12, or the logic could reside in central controller 28 and could be invoked through intelligent network signaling. Further, the logic could be generally applicable for all subscribers, or the logic could be defined specifically for station 12 such as in the service profile that the network maintains for station 12.

To carry out the exemplary embodiment, a mechanism should be provided to identify the subscriber account whose service profile is to be changed in response to a feature code sent from station 12, or the subscriber accounts whose service profiles are to be changed in response to a feature code sent from station 12. As presently contemplated, this can be done by either identifying one or more other subscriber accounts in the origination message itself or by pre-setting the service profile of station 12 to indicate one or more other subscriber accounts to be impacted.

In one embodiment, for instance, the dialed digits of the origination message could include the feature code together with an identification of one or more other subscriber accounts whose profiles are to be changed in response to the feature code. For example, if the feature code *721 means that call forwarding should be turned on, and if subscriber station 14 is operating under directory number 913-414-1414, then the dialed digits

*721 #9134141414 could mean that call forwarding should be turned on for the subscriber account of station 14. In this example, a pound sign is used to delimit the feature code from the target account number.

As another example, if the feature code *72 followed immediately by a directory number means that a forward-to number is being set to the directory number, and if subscriber station 16 is operating under the directory number 913-616-1616, then the dialed digits

*72 4085550303 #9136161616 could mean that the forward-to number in the service profile of subscriber account number 913-616-1616 (i.e., the subscriber account of station 16) should be set to be 408-555-0303. Notice again in this example that a pound sign is used to delimit the feature code and forward-to number from the target account number.

As still another example, the dialed digits could list multiple subscriber accounts that are to be impacted. For instance, the dialed digits

*721 #9134141414 #9136161616 could mean that call-forwarding is to be turned on in the profiles of subscriber account numbers 9134141414 (i.e., the subscriber account of station 14) and 9136161616 (i.e., the subscriber account of station 16).

Alternatively, the dialed digits could carry a group identifier that the network then translates into multiple subscriber accounts that are members of the group. For instance, the network might maintain translation data (generally for all subscribers, or specifically in the service profile of station 12) that correlates group identifier 101016755 with subscriber account numbers 9134141414 and 9136161616. Thus, by reference to that translation data, the network could interpret the dialed digits

*721 #101016755 to mean that call forwarding is to be turned on for both subscriber accounts 9134141414 and 9136161616.

In another embodiment, the service profile in effect for station 12 could be pre-set to indicate one or more other subscriber accounts whose profiles are to be changed when station 12 sends a given feature code. For instance, the service profile for station 12 could include data that indicates one or more subscriber accounts whose profiles are to be changed whenever station 12 sends any feature code. Alternatively, the service profile for station 12 could include a table that specifies one or more subscriber accounts whose profiles are to be changed depending on the feature code that station 12 sends into the network. An example of such a table is as follows:

TABLE 1

STATION 12 TARGET ACCOUNTS

| FEATURE CODE | TARGET ACCOUNT(S) |
|---|---|
| *345 | 9134141414 |
| *678 | 9136161616 |
| *987 | 9134141414; 9136161616 |

Based on this table, the feature code *345 sent by station 12 would cause a change in the profile of account number 9134141414, the feature code *678 sent by station 12 would cause a change in the profile of account number 9136161616, and the feature code *987 sent by station 12 would cause a change in the profile of both account numbers 9134141414 and 9136161616.

In addition, in order to carry out the exemplary embodiment, a mechanism should be provided for network 18 to identify the profile change that is to be made in response to a feature code provided by station 12. One way to do this is to use generally applicable feature codes but to treat them specially based on logic in the service profile of station 12 or based on other data provided with the feature code. The above examples illustrate this. For instance, if the feature code *72 followed immediately by a directory number means that a forward-to number should be set in the profile of the subscriber who sends those digits, then the same feature code *72 followed by a directory number and then by a target account number (e.g., pound-sign delimited) could mean that the forward-to number should be set in the profile of the specified target account instead.

As another example, the feature code could be a predefined variant of a generally applicable feature code. For instance, if the feature code *721 sent from station 12 would normally mean to turn on call forwarding in the profile for station 12, the feature code *721## (i.e., with two added pound signs) could mean that call forwarding is to be turned on for another subscriber account instead.

Another way to identify the profile change that should be made in response to a feature code provided by station 12 is to have pre-set the service profile of station 12 to correlate particular feature codes with particular profile changes and to then refer to that profile to identify the change to make. For example, the profile of station 12 could include a table such as the following:

TABLE 2

STATION 12 TARGET PROFILE CHANGES

| FEATURE CODE | PROFILE CHANGE |
|---|---|
| *345 | Turn on call forwarding and set forward-to number to be the directory number of station 12 |
| *678 | Turn off voice mail |
| *987 | Set forward-to number to be the directory number of station 12 |

Based on this table, the network would interpret the feature code *345 sent by station 12 to mean that call forwarding in another subscriber's profile is to be turned on and the forward-to number is to be set to the directory number of station 12, /the feature code *678 sent by station 12 to mean that voice mail in another subscriber's profile is to be turned off, and the feature code *987 sent by station 12 to mean that a forward-to number in another subscriber's profile is to be set to the directory number of station 12. This table could be combined with Table 1 above, to indicate both target accounts and changes to make.

Further in accordance with the exemplary embodiment, the service profile of station 12 could include authorization-data that indicates the extent to which station 12 is authorized to make changes to the service profiles of other subscriber accounts. When the network receives an origination message from station 12 that seeks a change in the profile of another subscriber account, the network could then refer to the data to determine if station 12 is authorized to change the profile of that other subscriber account before the network makes the requested change. For example, the profile of station 12 could include a table such as the following:

TABLE 3

STATION 12 AUTHORIZATIONS

| TARGET ACCOUNT | AUTHORIZED? |
|---|---|
| 9134141414 | Yes |
| 9136161616 | Yes |

Based on this table, the network would allow station 12 to make changes to the service profile of account number 9134141414 (the profile of station 14), and the network would allow station 12 to make changes to the service profile of account number 9136161616 (the profile of station 16). Alternatively, either of these entries could be set to "No" to indicate that the network should not allow station 12 to make changes to the service profile of a particular account. This table could be combined with those above as well.

Similarly, the service profiles of other subscriber accounts could include authorization data indicating whether station 12 is authorized to make changes to the service profiles of those other accounts. When the network receives an origination message from station 12 that seeks a change in the profile of another subscriber account, the network could then refer to the profile of that other account to determine if station 12 is authorized to change the profile of that other account before the network makes the requested change. For example, if station 12 operates under account number 9132121212, then the profile of station 14 could include a table such as the following:

TABLE 4

STATION 14 AUTHORIZATIONS

| SUBSCRIBRE ACCOUNT | SCOPE/RESTRICTIONS |
|---|---|
| 9132121212 | Any changes |
| 9136161616 | Only toggle call forwarding |

Based on this table, the network would allow station 12 to make any changes to the profile of station 14, but the network would allow station 16 to only turn call forwarding on or off for station 14 and to not make any other changes to the profile of station 14.

3. Example Applications

Several examples will help illustrate how the exemplary embodiment can be carried out in practice. The first example will illustrate a scenario where station 12 sends an origination message to serving system 20 and serving system 20 responsively changes the service profile for station 14. The second example will illustrate a scenario where station 12 sends an origination message to serving system 20, serving system 20 signals to central control point 28, and central control point 20 responsively changes the service profile for station 16. And the third example will illustrate a mobile phone service scenario in which a feature code from station 12 causes an HLR profile for station 16 to be changed.

For purposes of these examples, assume that the data tables set out above are in effect. That is, assume the profile for station 12 includes tables 1-3 or some combination thereof. And assume that the profile for station 16 includes table 4.

a. Example: Change in Profile at Serving System

In this first example, assume that serving system 20 receives an origination message from station 12 that includes dialed digits *345. In response to the dialed digits from station 12, the serving system would refer to the service profile for station 12 in profile store 32, and the serving system would determine that the feature code *345 from station 12 means that, in the service profile for account number 9134141414 (the profile for station 14), call-forwarding should be turned on and the forward-to number should be set to the directory number of station 12, say 9132121212.

Further, the serving system 20 may refer to the service profile of station 14, to determine whether a subscriber operating under account number 9132121212, such as station 12, is authorized to make changes to the service profile in effect for account number 9134141414. Based on Table 4 as noted above, the serving system 20 would determine that authorization exists. The serving system would then make the designated change to the profile for account number 9134141414.

b. Example: Change in Profile at Central Control Point

In this second example, assume that serving system 20 receives an origination message from station 12 that includes dialed digits *721 ##9136161616. Assume further that serving system 20 includes call processing logic that defines all feature codes as intelligent network trigger points. Thus, in response to this feature code, serving system 20 may send an SS7 TCAP message via signaling system 26 to central control point 28, providing central control point 28 with the calling party (station 12, at number 9132121212) and the dialed digits (*721 ##9136161616).

When the central control point 28 receives the TCAP message, it will then apply core program logic to parse the message so as to read the calling number and the dialed digits. It may then determine based on its core logic that the dialed digits comprise the generally applicable feature code *721 followed by the special delimiter ##, which means that the feature code from station 12 is attempting to turn on call forwarding for another subscriber account. Further, the central control point 28 would determine that the dialed digits specify the target account 9136161616 following the delimiter.

The central control point 28 may then refer to the profile for station 12 in profile store 30 to determine that station 12 is authorized to make changes to the profile of account number 9136161616 (station 16). Further, the central control point may refer to the profile for station 16 in profile store 30 to determine that station 12 is authorized to toggle call forwarding in the service profile of account number 9136161616. Thus, the central control point may then modify the service profile of station 16 to indicate that call forwarding is active. And the central control point may then send a response TCAP message to serving system 20, to complete the transaction.

c. Example: Changing Mobile Phone Profile in HLR

Figure 3:
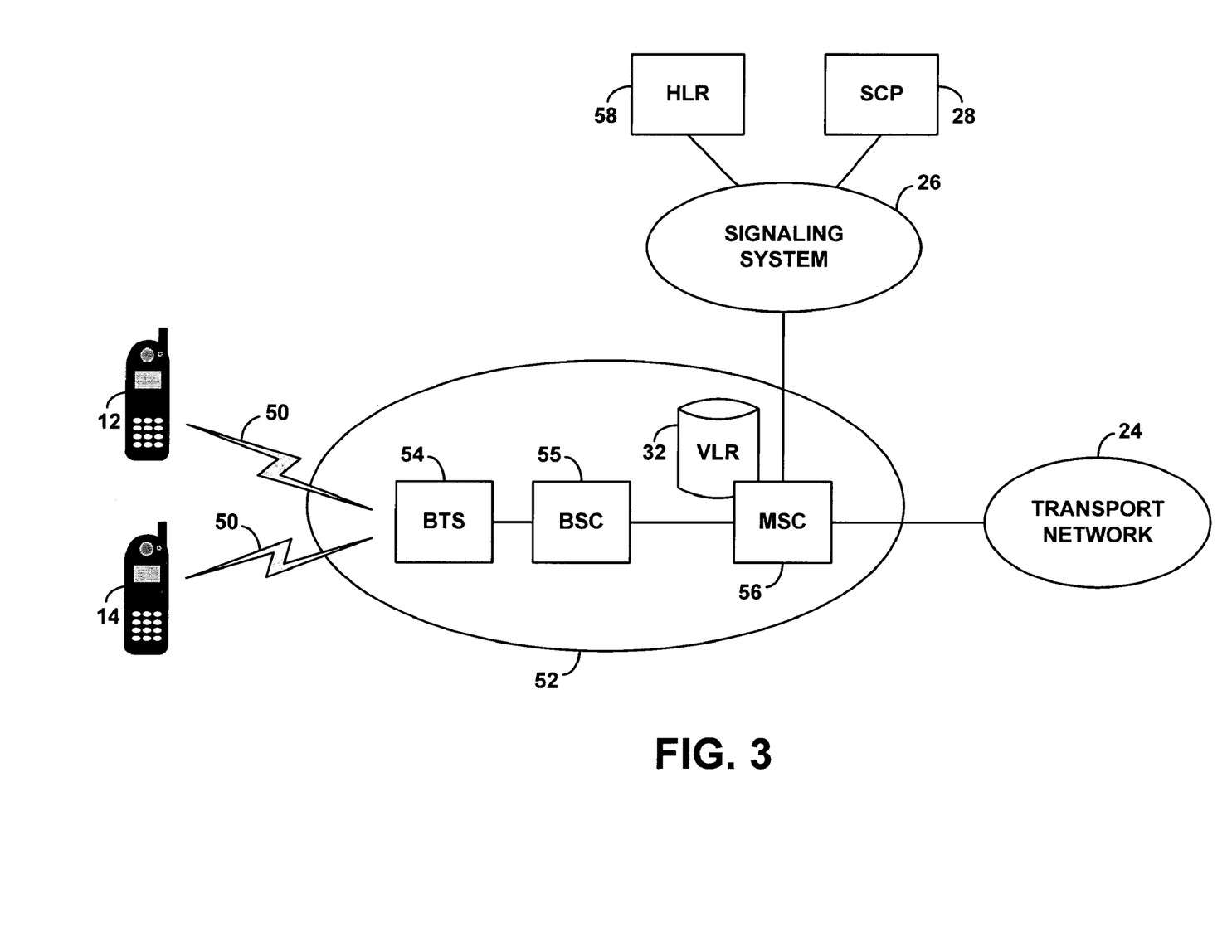
FIG. 3 is a block diagram of a wireless communication system in which the exemplary embodiment can be employed.
Figure 4:
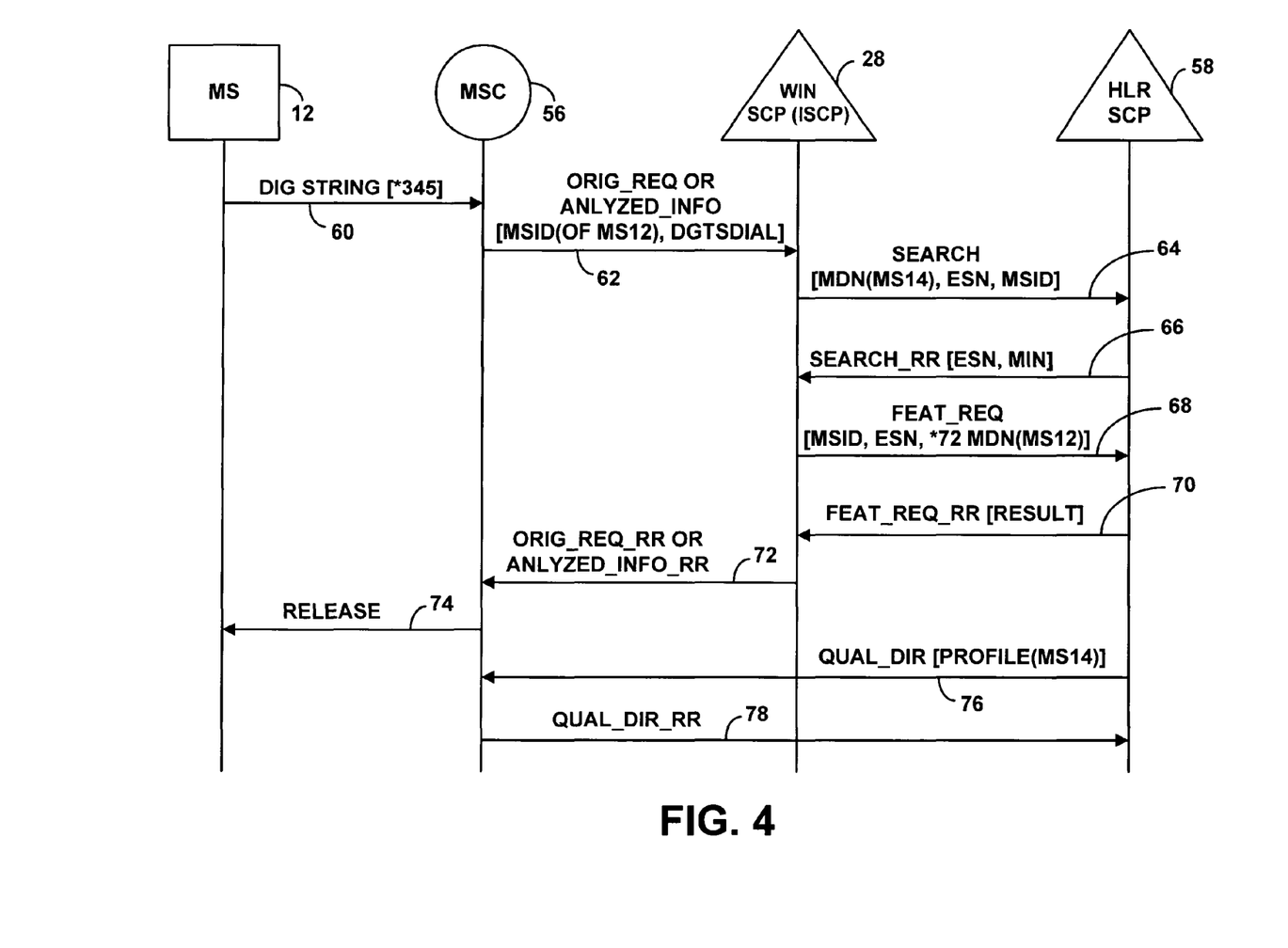
FIG. 4 is a message-flow diagram depicting messages that can be exchanged when carrying out the exemplary embodiment in the arrangement of FIG. 3.

This final example illustrates how the exemplary embodiment can be applied to change a subscriber service profile in an HLR maintained by a wireless carrier. FIG. 3 is a block diagram depicting more specifically a system in which this example could take place, and FIG. 4 is a message-flow diagram showing an example set of messages that could be exchanged in order to carry out the example.

In the system of FIG. 3, subscriber stations 12 and 14 are both mobile stations that communicate over an RF air interface 50 (using a protocol such as CDMA, TDMA or GSM for instance) with a radio access network 52. The radio access network 52 in this example comprises a base transceiver station (BTS) 54, which is coupled with a base station controller (BSC) 55, which is in turn coupled with a mobile switching center (MSC) 56. MSC 56 then provides connectivity with transport network 24 and is further coupled with signaling system 26. And signaling system 26 provides connectivity with an SCP 28 and with an HLR 58.

Assume in this scenario that the mobile station 12 and mobile station 14 are both owned by the same person, but the two mobile stations operate under separate subscriber accounts and therefore have separate service profiles. Assume further that mobile station 12 is mounted in the person's car, and mobile station 14 is a portable handheld phone.

Whenever the person is in his car, the person might want to have calls placed to his portable mobile station 14 be forwarded to his car mobile station 12. For this purpose, the person could program an autodial button on car mobile station 12 with the feature code *345, so that the person could press that button in order to send an origination message with the dialed digits *345 into the network. Assume then that the service profile data noted above are in place.

Referring to FIG. 4, at step 60, mobile station 12 sends an origination message with the digit string *345 into the network, namely via air interface 50 and to MSC 56 in radio access network 52. At step 62, as MSC 56 then conventionally analyzes the dialed digits, MSC 56 encounters an all-digits trigger or a specific digits trigger and responsively sends an IS-41 Origination_Request message or IS-771 Analyzed_Info message via signaling system 26 to SCP 28. The message to the SCP would provide the SCP with an identifier of the originating station, such as its MSID, as well as the dialed digits *345.

SCP 28 then applies service logic (e.g., applying core logic and/or referring to service profiles) based on the dialed digits *345 and on the originating station account number (e.g., MSID) and thereby determines that the feature code means the call forwarding feature should be turned on for the mobile station directory account number 9134141414 (i.e., mobile station 14).

To effect this profile change, at step 64, the SCP sends an IS-41 Search message via signaling system 26 to HLR 58, seeking an indication of the MSID and ESN associated with directory number 9134141414. In response, at step 66, HLR 58 returns a search_rr message providing the requested MSID and ESN.

At step 68, SCP 28 then sends to HLR 58 an IS-41 Feature_Request message, instructing HLR 58 to turn on call forwarding in the service profile for account number 9134141414 and to forward calls to the directory number of station 12, i.e., 9132121212. An exemplary Feature_Request message would specify the MSID and ESN of station 14 and would carry the generally accepted feature code (e.g., *72) followed immediately by the directory number to be used as the forward-to number (i.e., 9134141414). From the perspective of the HLR, it would then seem as though this feature request came from station 14 itself.

HLR 58 then turns on the call forwarding feature and set the forward-to number as directed. And, at step 70, HLR 58 returns a feature_request_rr message, acknowledging that the requested change was made.

At step 72, SCP 28 then returns an origination_request_rr message or analyzed_info_rr message to MSC 56. At step 74, MSC 56 may then play a confirmation tone or message to mobile station 12, indicating that the requested change has been made.

Conventionally, when a service profile changes in an HLR, the HLR will update a visitor location register (VLR) copy of the profile in the serving system that is currently serving the subscriber at issue. In this case, since mobile station 14 is also served by MSC 56, HLR 58 would therefore send an IS-41 Qualification_Directive message to MSC 56, providing the revised profile of mobile station 14, at step 76. MSC 56 would then update the VLR profile, in profile store 32 for instance, and, at step 78, return a qual_dir_rr message to the HLR to complete the process.

4. CONCLUSION

An exemplary embodiment of the present invention has been illustrated and described. It will be understood, however, that changes and modifications may be made to the embodiment as described without deviating from the spirit and scope of the invention, as defined by the following claims.

For example, although the foregoing describes certain profile changes that one subscriber could make to another subscriber's service profile, a variety of other changes could be made as well. For instance, by sending a feature code into a network, one subscriber could effect a change in an instant-messaging buddy-list that the network maintains for another subscriber. Other examples are possible as well.

What is claimed is:

1. In a telecommunications network that maintains an account service profile respectively for each of a plurality of subscriber accounts, a method of changing at least a first account service profile that the network maintains for a first subscriber account, the method comprising:

receiving into the network, from a subscriber station operating under a second subscriber account, an origination message comprising as dialed digits a feature code concatenated with an identifier of the first subscriber account;

identifying, based at least in part on the feature code, a change to make to at least the first account service profile that the network maintains for the first subscriber account; and making the change to at least the first account service profile.

2. The method of claim 1, wherein the identifier of the first subscriber account is a directory number.

3. The method of claim 1, further comprising:

maintaining in the network, as part of the second account service profile, data indicating an authorization to change the first account service profile in response to a feature code provided in an origination message from a subscriber station operating under the second account service profile; and consulting the data to determine whether the authorization exists, before making the change to the first account service profile.

4. The method of claim 3, wherein the data maintained in the second account service profile identifies the first subscriber account.

5. The method of claim 1, further comprising:

maintaining in the network, as part of the first account service profile, data indicating an authorization to change the first account service profile in response to a feature code provided in an origination message from a subscriber station operating under the second account service profile; and consulting the data to determine whether the authorization exists, before making the change to the first account service profile.

6. The method of claim 5, wherein the data maintained in the first account service profile identifies the second subscriber account.

7. The method of claim 1, wherein receiving the origination message from the subscriber station comprises receiving the origination message wirelessly from the subscriber station.

8. The method of claim 1, wherein receiving the origination message comprises receiving the message into a serving system of the telecommunication network;

wherein the method further comprises the serving system signaling to a central control point, providing the central control point with at least the feature code; and wherein the central control point performs the function of identifying the change.

9. The method of claim 8, wherein the central control point further performs the function of making the change.

10. The method of claim 8, further comprising:

the central control point signaling to a home location register to effect the change.

11. The method of claim 1, wherein identifying a change to make to at least the first account service profile that the network maintains for the first subscriber account comprises:

identifying a first change to make to the first account service profile that the network maintains for the first subscriber account; and identifying a second change to make to a third account service profile that the network maintains for a third subscriber account.

12. The method of claim 11, wherein making the change to at least the first account service profile comprises:

making the first change to the first account service profile; and making the second change to the third account service profile.

13. The method of claim 1, wherein the change comprises a change to a call-forwarding service.

14. The method of claim 13, wherein the change comprises an action selected from the group consisting of activating call forwarding, deactivating call forwarding, and setting a forward-to number.

15. The method of claim 13, wherein making the change comprises setting the call-forwarding feature to direct calls to be forwarded to the second subscriber station.

16. In a telecommunications network that maintains an account service profile respectively for each of a plurality of subscriber accounts, a system for changing at least a first account service profile that the network maintains for a first subscriber account, the system comprising:
a serving system;
a signaling system; and
a central control point communicatively linked with the serving system by the signaling system,
wherein the serving system receives, from a subscriber station operating under a second subscriber account, an origination message comprising as dialed digits a feature code concatenated with an identifier of the first subscriber account, and the serving system is arranged to signal to the central control point, providing the central control point with at least the feature code, and
wherein the central control point is arranged to identify, based at least in part on the feature code, a change to make to the first account service profile that the network maintains for the first subscriber account.

17. The system of claim 16, wherein the central control point is further arranged to make the change.

18. The system of claim 16, further comprising a home location register that maintains the first account service profile, wherein the central control point is further arranged to signal to the home location register in order to effect the change.

19. The system of claim 16, wherein the central control point maintains the first account service profile and the second account service profile.

20. The system of claim 16, wherein the identifier of the first subscriber account is a directory number.

21. The system of claim 16, further comprising:
data maintained as part of the second account service profile, the data indicating an authorization to change the first account service profile in response to a feature code provided in an origination message from a subscriber station operating under the second account service profile,
wherein the central control point is arranged to consult the data to determine whether the authorization exists.

22. The system of claim 21, wherein the data maintained in the second account service profile identifies the first subscriber account.

23. The system of claim 16, further comprising:
data maintained in the network as part of the first account service profile, the data indicating an authorization to change the first account service profile in response to a feature code provided in an origination message from a subscriber station operating under the second account service profile,
wherein the central control point is arranged to consult the data to determine whether the authorization exists.

24. The system of claim 23, wherein the data maintained in the first account service profile identifies the second subscriber account.

25. The system of claim 16, wherein the serving system comprises:
a base station; and
a switch,
wherein the base station receives the origination message wirelessly from the subscriber station and forwards the origination message to the switch, and
wherein the switch signals to the central control point.

26. In a telecommunications network that maintains an account service profile respectively for each of a plurality of subscriber accounts, a method of changing at least a first account service profile that the network maintains for a first subscriber account, the method comprising:
receiving into the network, from a subscriber station operating under a second subscriber account, an origination message comprising a feature code;
identifying, based at least in part on the feature code, a change to make to at least the first account service profile that the network maintains for the first subscriber account;
maintaining in the network, as part of a second account service profile that the network maintains for the second subscriber account, data indicating an authorization to change the first account service profile in response to a feature code provided in an origination message from a subscriber station operating under the second account service profile; and
after consulting the data to determine whether the authorization exists, making the change to at least the first account service profile.

27. The method of claim 26, wherein the data maintained in the second account service profile identifies the first subscriber account.

28. In a telecommunications network that maintains an account service profile respectively for each of a plurality of subscriber accounts, a method of changing at least a first account service profile that the network maintains for a first subscriber account, the method comprising:
receiving into the network, from a subscriber station operating under a second subscriber account, an origination message comprising a feature code;
identifying, based at least in part on the feature code, a change to make to at least the first account service profile that the network maintains for the first subscriber account;
maintaining in the network, as part of the first account service profile, data indicating an authorization to change the first account service profile in response to a feature code provided in an origination message from a subscriber station operating under a second account service profile that the network maintains for a second subscriber account; and
after consulting the data to determine whether the authorization exists; making the change to at least the first account service profile.

29. The method of claim 28, wherein the data maintained in the first account service profile identifies the second subscriber account.

30. In a telecommunications network that maintains an account service profile respectively for each of a plurality of subscriber accounts, a method of changing at least a first account service profile that the network maintains for a first subscriber account, the method comprising:
receiving into the network, from a subscriber station operating under a second subscriber account, an origination message comprising a feature code;

identifying, based at least in part on the feature code, a change to make to at least the first account service profile that the network maintains for the first subscriber account; and making the change to at least the first account service profile, wherein receiving the origination message comprises receiving the message into a serving system of the telecommunication network, wherein the method further comprises the serving system signaling to a central control point, providing the central control point with at least the feature code, wherein the central control point performs the function of identifying the change, and wherein the method further comprises the central control point signaling to a home location register to effect the change.

31. In a telecommunications network that maintains an account service profile respectively for each of a plurality of subscriber accounts, a system for changing at least a first account service profile that the network maintains for a first subscriber account, the system comprising:

a serving system;

a signaling system;

a central control point communicatively linked with the serving system by the signaling system; and a home location register that maintains the first account service profile, wherein the serving system receives, from a subscriber station operating under a second subscriber account, an origination message comprising a feature code, and the serving system is arranged to signal to the central control point, providing the central control point with at least the feature code, and wherein the central control point is arranged to identify, based at least in part on the feature code, a change to make to the first account service profile that the network maintains for the first subscriber account, and wherein the central control point is further arranged to signal to the home location register in order to effect the change.

32. In a telecommunications network that maintains an account service profile respectively for each of a plurality of subscriber accounts, a system for changing at least a first account service profile that the network maintains for a first subscriber account, the system comprising:

a serving system;

a signaling system; and a central control point communicatively linked with the serving system by the signaling system, wherein the serving system receives, from a subscriber station operating under a second account service profile that the network maintains for a second subscriber account, an origination message comprising a feature code, and the serving system is arranged to signal to the central control point, providing the central control point with at least the feature code, wherein the central control point is arranged to identify, based at least in part on the feature code, a change to make to the first account service profile that the network maintains for the first subscriber account, and wherein the central control point is arranged to consult data to determine the existence of an authorization to change the first account service profile in response to the feature code provided in the origination message from the subscriber station operating under the second account service profile, wherein the data is maintained in the network as part of the first account service profile.

* * * * *